(12) United States Patent
Harasawa

(10) Patent No.: US 8,526,030 B2
(45) Date of Patent: Sep. 3, 2013

(54) IMAGE FORMING APPARATUS, POWER SUPPLYING METHOD, AND RECORDING MEDIUM

(75) Inventor: Yusuke Harasawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 13/034,081

(22) Filed: Feb. 24, 2011

(65) Prior Publication Data

US 2011/0228303 A1    Sep. 22, 2011

(30) Foreign Application Priority Data

Mar. 17, 2010  (JP) ................................. 2010-061691
Jan. 21, 2011  (JP) ................................. 2011-010921

(51) Int. Cl.
*G06K 15/00* (2006.01)
*G06F 1/00* (2006.01)
*G03G 15/00* (2006.01)
*G03G 15/08* (2006.01)
*G03G 15/043* (2006.01)
*G03G 21/00* (2006.01)

(52) U.S. Cl.
USPC ............. 358/1.14; 714/300; 714/340; 399/9; 399/37; 399/44; 399/51; 399/75

(58) Field of Classification Search
USPC .................. 714/300, 340; 399/9, 37, 44, 51, 399/75
See application file for complete search history.

(56) References Cited

FOREIGN PATENT DOCUMENTS
JP       2006-217075        8/2006

*Primary Examiner* — Twyler Haskins
*Assistant Examiner* — Justin Katzwhite
(74) *Attorney, Agent, or Firm* — IPUSA, PLLC

(57) ABSTRACT

An image forming apparatus includes a reading unit reading an original document and generating image data; a power source unit supplying power to the reading unit; a power source switching signal output unit outputting a switching signal for switching between supply and shut-off of the power for any one of an image pickup element and an image processing unit; a measuring unit measuring a power stopping time while the power is shut off; a judging unit determining whether to carry out only a first initial setting when the measured power stopping time is less than a predetermined time and whether to carry out both the first initial setting and a second initial setting when the measured power stopping time is the predetermined time or more; and an initial setting unit carrying out only the first initial setting or the second initial setting also upon the determination by the judging unit.

19 Claims, 10 Drawing Sheets

FIG.6

| NAME OF UNIT | PLUG-IN MODE | MAIN SW STARTUP MODE | STANDBY MODE | SCANNER MODE | PRINT 1 MODE | PRINT 2 MODE | SLEEP MODE |
|---|---|---|---|---|---|---|---|
| SYSTEM CONTROL UNIT | OFF | ON | ON | ON | ON | ON | PARTIALLY ON |
| OUTER I/F UNIT | OFF | ON | ON | ON | ON | ON | ON |
| IMAGE WRITING FUNCTION UNIT | OFF | ON | ON | ON | ON | ON | OFF |
| READING UNIT | OFF | ON | OFF | ON | OFF | OFF | OFF |
| OPERATIONS UNIT | OFF | ON | ON | ON | ON | PARTIALLY ON | PARTIALLY ON |

IMAGE FORMING APPARATUS, POWER SUPPLYING METHOD, AND RECORDING MEDIUM

BACKGROUND OF THE INVENTION

1. Field of the Invention

The present invention relates to an image forming apparatus, especially to an image forming apparatus including a scanner device and a plotter device, a power supplying method for this image forming apparatus and a recording medium for this image forming apparatus.

2. Description of the Related Art

An image forming apparatus called Multifunction Peripheral (MFP) or digital complex machine includes several functional groups such as a scanner device and an image forming unit. Then, an electric power control unit may be provided to suppress power consumption by turning on or off power supplies to various portions. The power control unit may turn off a power supplied to the scanner device when a scanner device is not used for a long time as disclosed in Patent Document 1. Patent Document 1 discloses an image forming apparatus for supplying power to the scanner device and an image writing unit only when it is necessary to read an original document or write an image for the purpose of reducing the power consumption.

One type of image forming apparatus may cause the following problems. In order to read images with high image quality, it is necessary for the scanner device to be provided with an initial setting of setting information for reading images at the next power supply after the power supply is once stopped.

In order to reduce the power consumption, the image forming apparatus relatively frequently turns on or off the power supply to the scanner device. Therefore, the initial setting is repeated every turning on or off. Although it does not require a long time for the initial setting, a user may feel frustration if there occur frequent waiting times. Availability of the image forming apparatus is degraded if there occur frequent waiting times for the initial setting.

Patent Document 1: Japanese Laid-Open Patent Application No. 2006-217075.

SUMMARY OF THE INVENTION

Accordingly, embodiments of the present invention may provide a novel and useful apparatus and method for solving one or more of the problems discussed above.

More specifically, the embodiments of the present invention may provide an image forming apparatus by which an energy saving effect is maintained and a time loss spent by initial setting is reduced as much as possible.

One aspect of the embodiments of the present invention may be to provide an image forming apparatus including a reading unit configured to read an original document and generate image data; a power source unit configured to supply power to the reading unit; a power source switching signal output unit configured to output a switching signal for switching between supply and shut-off of the power for at least any one of an image pickup element included in the reading unit and an image processing unit included in the reading unit; a measuring unit configured measure a power stopping time while the power to the reading unit is shut off; a judging unit configured to determine whether to carry out only a first initial setting for setting a first setup value in the reading unit when the measured power stopping time is less than a predetermined time and whether to carry out both the first initial setting and a second initial setting for setting a second setup value in the reading unit when the measured power stopping time is the predetermined time or more; and an initial setting unit configured to carry out only the first initial setting or both the first initial setting and the second initial setting upon the determination by the judging unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 6 illustrates an example operational mode of the image forming apparatus determined whether power is supplied to various portions of the image forming apparatus.

DETAILED DESCRIPTION OF THE PREFERRED EMBODIMENTS

A description is given below, with reference to the FIG. 1 through FIG. 10 of embodiments of the present invention.

Reference symbols typically designate as follows:

1: Plotter device;
2: Scanner device;
12: System control unit;
14: Head;
20: CIS(Contact sensor);
21: First reading image processing unit;
22: Second reading image processing unit;
23: Operations unit;
24: Original document feed motor;
25: Scanner sensor;
26,27: Power source switching unit;
28: Original document supporter;
30: Original document pressure plate;
40: Paper feeding unit;
41a,41b,42a,42b,43: Paper ejecting roller;
46: Resisting motor;
47: Carriage;
48a,48b,49a,49b: Paper ejecting roller;
50: Cutter;

60: Image forming unit;
70: Reading unit; and
100: Image forming apparatus.

A terminology of "original document" (manuscript) may include a handwritten original document, printed original document and computer generated original document.

Preferred embodiments of the present invention are explained next with reference to accompanying drawings.

Figure 1:
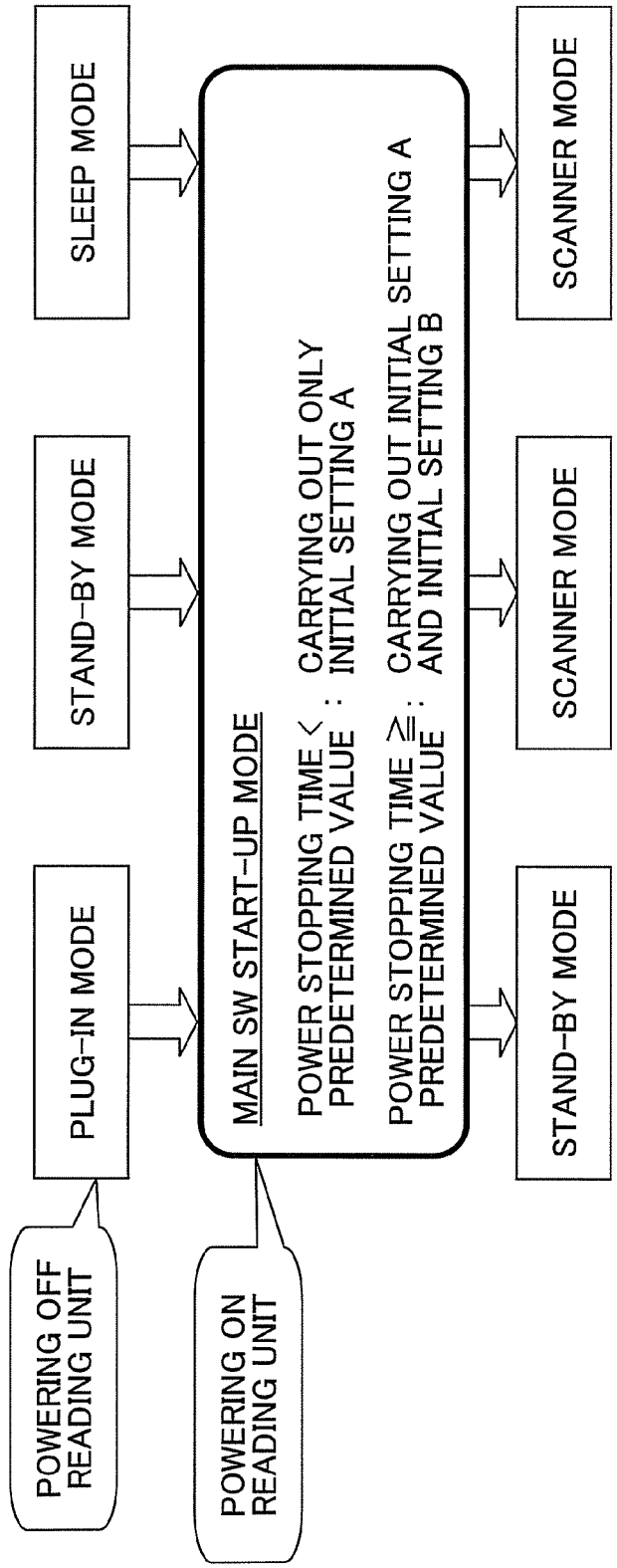
FIG. 1 schematically illustrates an image forming apparatus according to an embodiment of the present invention.

FIG. 1 schematically illustrates an image forming apparatus according to an embodiment of the present invention.

Setup information stored in a reading unit of the image forming apparatus is classified to:

Setup information A changing within a relatively short time and; and

Setup information B not changing within a relatively short time.

The setup information may be generated when the image forming apparatus carries out the initial setting. Hereinafter, the initial setting by which the setup information A is obtained is referred to as initial setting A, and the initial setting by which the setup information B is obtained is referred to as initial setting B.

The setup information B does not change within a relatively short time. Therefore, it is scarcely necessary to adjust with the image forming apparatus every time a reading unit is powered on.

The image forming apparatus of the embodiment carries out "initial setting A and initial setting B" when a stopping time of power supply is a predetermined value or more in comparison with the stopping time, and carries out only "initial setting A" when the stopping time of power supply is less than the predetermined value.

By selecting the initial setting depending on the stopping time of the power supply, it is possible to shorten a start-up time of the reading unit. At an adjusting timing, the power supply of the reading unit is changed from an operational mode being a power-OFF to an operational mode of a power-ON. For example, when the initial setting carried out by the image forming apparatus after the original document is inserted in a main SW start-up mode after the original document is inserted, a start-up time of the scanner device can be shortened. The power supply to the scanner device is turned off at a conventional timing such as a nonuse of the scanner device for a long time. Therefore, it is possible to maintain an effect of reducing the power consumption.

<Configuration>

Figure 2:
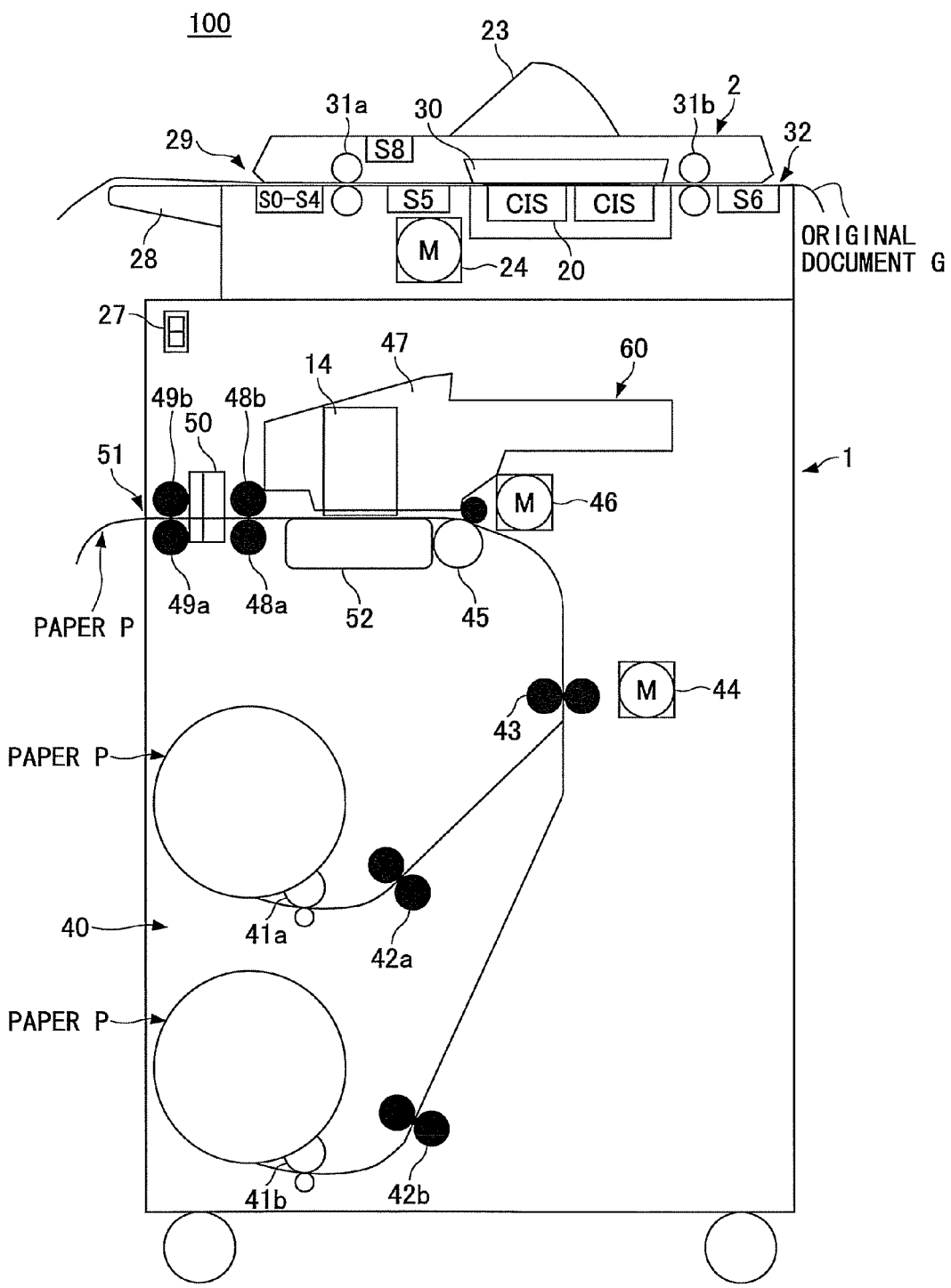
FIG. 2 illustrates an example entire structure (side view) of the image forming apparatus.

FIG. 2 illustrates an example entire structure (side view) of an image forming apparatus. The image forming apparatus 100 includes a plotter device 1 and a scanner device 2 as main components.

The plotter device 1 includes an image forming unit 60 and a paper feeding unit 40. Two roll papers P are wound around the paper feeding unit 40 around an axis located parallel to a main scanning direction. The number of the roll papers is one or three or more. The paper feed tray for feeding a rectangular paper (not roll paper P) may be installed in the paper feeding unit 40.

On tip ends of the roll papers P, paper feeding rollers 41a, 41b, 42a, 42b and 43 are provided. The papers are drawn toward the image forming unit 60. After the papers are carried by the paper feeding rollers 41a, 41b, 42a, 42b and 43, the papers are fed to the resisting roller 45. The roll papers P are connected until these roll papers P are cut immediately before the ejection port 51. The paper feeding rollers 41a, 41b, 42a, 42b and 43 are driven by the paper feeding motor 44.

The image forming unit 60 includes a resist roller 45, a resisting motor 46 for driving the resist roller 45, a platen 52, a head 14, paper ejecting rollers 48a, 48b, 49a, and 49b, a cutter 50, and an ejection port 51.

The roller paper P is fed by the resisting roller 45 onto the platen 52. Plural holes are formed in the platen 52. A suction fan is located below the platen 52 to suck the roll paper P on the platen 52. It is possible to suck the roll paper P toward the platen 52 by a suction power with the suction fan via the plural holes. With this structure, deflection of the roll paper P is prevented and flatness of the roll paper is maintained.

The head 14 is mounted on the carriage 47 on an upper portion of the platen 52. Because the carriage reciprocally moves in the main scanning direction of the roll papers, an image is formed by ejecting ink droplets toward the roll paper P on the platen 52. Not only a serial type but also a line type in which the head 14 is arranged in the main scanning direction, an effect of reducing the power consumption of the scanner device 2 is obtainable. An image forming unit 60 of an electronic photographic type may be installed in the plotter device 1.

The roll papers P on which images are formed are fed to a predetermined position by the paired paper ejecting rollers 48a, 48b and 49a, 49b, and then ejected from the ejection port after being cut by the cutter 50.

The scanner device 2 employs a paper feeding mechanism of an original document through type. The scanner device 2 includes an original document supporter 28, an original document insertion port 29 into which an original document on the original document supporter 28 is inserted, a contact sensor (hereinafter, referred to as contact image sensor (CIS), one type of image pickup element, which is provided inside the contact glass and reads the original document), an original document pressure plate 30 on the contact glass, and original document feed rollers 31a, 31b which are arranged along an original document feeding path and arranged by being interposed between the CIS 20 and the original document pressure plate 30.

The CIS 20 irradiates reading light, preferably LED light, on the original document, converts the reflected light by photoelectric conversion, and reads an image on the original document. The CIS 20 is an example of a solid-state image sensor. A CCD, a CMOS or the like may be used as the solid-state image sensor.

Figure 3:
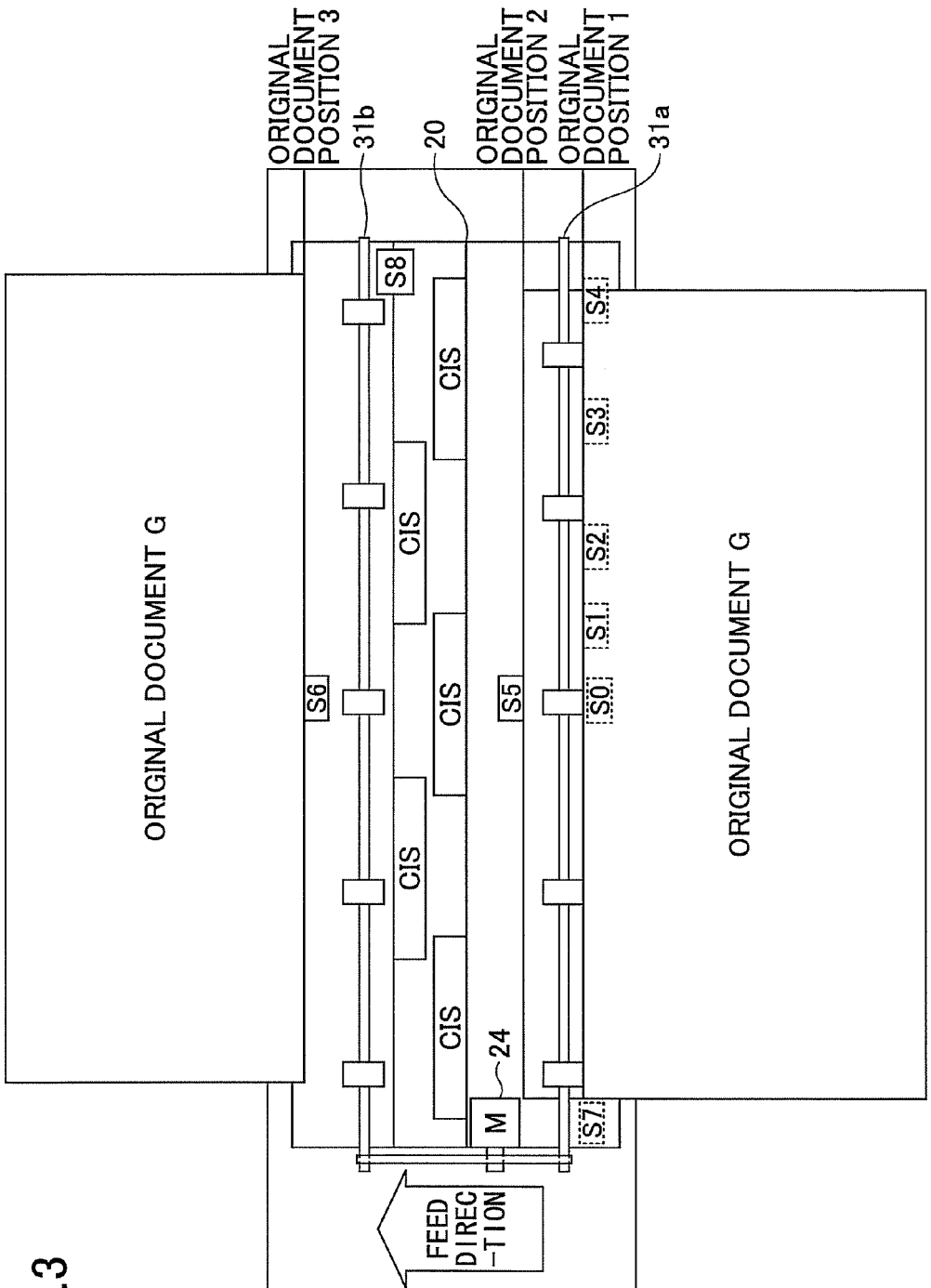
FIG. 3 schematically illustrates an example structure (plan view) of the image forming device.

FIG. 3 is a plan view of the scanner device 2. On the downstream side of the original document insertion port 29, sensors S0 to S4 are arranged. The sensor S0 (hereinafter, referred to as an original document insertion sensor) is a sensor for detecting an inserted original document. The original document insertion sensor S0 is arranged substantially in a center of the main scanning direction of the image forming apparatus 100 and enabled to detect the inserted original document when the original document is not extremely small.

On an inner side of the contact glass of the original document feeding face, an original document feed motor 24 for feeding the original document G by driving the original document feed rollers 31a, 31b are provided. On the upper portion of the original document feeding face, an operations unit 23 (not illustrated in FIG. 3) and an emergency stopping key S8 for stopping feeding of the original document are provided.

The sensors S1 to S4 (hereinafter, referred to as original document size sensors S1 to S4) are provided to detect the size of the original document. The original document size sensors S1 to S4 are arranged with intervals on only one side of the scanning direction from the original document insertion sensor S0. The intervals are adjusted depending on the original document size. By detecting the original document covering the original document size sensors S1 to S4, it is possible to determine the original document size.

An original document resisting sensor S5 for outputting an original document width signal indicative of the width in the sub scanning direction of the original document is arranged on the downstream side of the original document insertion sensor S0. The original document ejection sensor S6 is arranged inside the contact glass around the ejection port 32 in order to detect ejection of the original document.

The scanner device 2 of the embodiment is described as a sheet-through type scanner in which an image sensor is fixed and an original document is fed for reading. However, it is possible to reduce the power consumption of the scanner device 2 in use of another type such as an automatic document feeder (ADF).

<Plotter Device>

Figure 4:
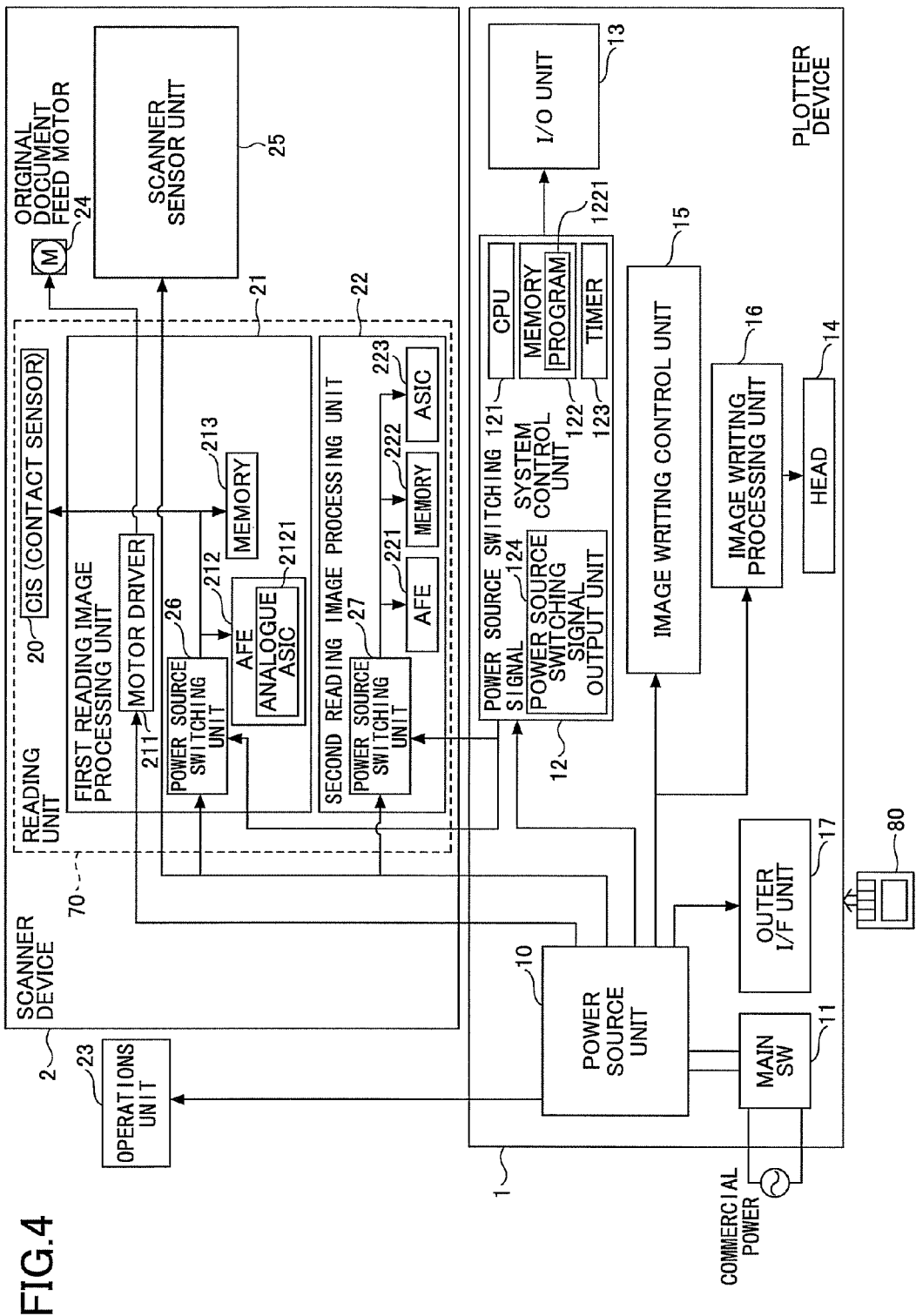
FIG. 4 illustrates an example hardware block chart of the image forming apparatus.

FIG. 4 illustrates an example hardware block chart of the image forming apparatus 100. The image forming apparatus 100 includes a plotter device 1 and a scanner device 2 as main components as described above.

The plotter device 1 includes a power source unit 10, a system control unit 12, an I/O unit 13, an image writing control unit 15, an image writing processing unit 16, a head 14, an outer I/F unit 17, and a main SW 11.

The power source unit 10 is connected to an outer commercial power source via the main SW 11, and generates a predetermined constant voltage and a predetermined constant electric power by rectifying the commercial power source and adjusting the voltage. The power source unit 10 supplies the predetermined constant voltage and the predetermined constant electric power to the scanner device 2, the system control unit 12, the image writing control unit 15, the image writing control unit 16 and the outer I/F unit 17. The main SW 11 supplies the power from the commercial power source to the power source unit 10 and stops the power from the commercial power source to the power source unit 10.

The system control unit 12 includes a CPU 121, a memory 122, a timer 123 and a power source switching signal output unit 124. The CPU 121 carries out a program 1221 stored in the memory 122, and controls the entire system control unit 12. The program 1221 is installed from a recording medium 80 or a network server via the outer I/F unit 17.

The timer 123 measures a time (hereinafter, referred to as power stopping time) while the power source of the reading unit 70 is shut down. The timer 123 may function with a battery and can measure the power stopping time of the reading unit 70 even when the power is not supplied to the system control unit 12. The timer 123 may be a counter or may acquire a time when the power source from the RTC (not illustrated) to the reading unit 70 is shut down and stores the time, and may calculate passage of time from the stored time.

The power source switching signal output unit 124 is controlled by the CPU 121, sends a power source switching signal to the power source switching units 26, 27 to thereby change the supply of shut-down of the power to the reading unit 70.

An outer apparatus such as a personal computer and a server is connected to the outer I/F unit 17, and the outer I/F unit 17 sends image data to or receives the image data from the outer apparatus. The outer I/F unit 17 includes a communication unit for connecting to a network.

The image writing control unit 15 provides image processing to image data formed on the roll paper P under a control of the system control unit 12. The image data read by the scanner device 2 may be separated to extract an image portion. A character portion may be provided with an edge reinforcement process, and a background process may be provided with a smoothing process. When print data are sent from the personal computer, the print data may be rendered so as to be converted into raster data, and the characters and background are provided with appropriate image processing. In these cases, the image writing control unit 15 replaces the image with pixel values for each pixel by a predetermined number of lines on the screen.

The image writing processing unit 16 discharges an appropriate color ink at an proper timing by controlling nozzles of the head 14 in order to write the image data output from the image writing control unit 15 to the roll paper P.

A paper feeding motor 44, a resisting motor 46, a carriage motor and so on are connected to the I/O unit 13.

<Scanner Device>

The scanner device 2 includes a first reading image processing unit 21, a second reading image processing unit 22, an original document feed motor 24, a scanner sensor 25, and a CIS 20. Power is supplied from the power source unit 10 to the operations unit 23, the first reading image processing unit 21, the second reading image processing unit 22, the original document feed motor 24 (motor driver 211, and the scanner sensor 25.

The first reading image processing unit 21 includes a power source switching unit 26, a motor driver 211, an analogue front end (AFE) 212, and a memory 213. The AFE 212 includes an analogue Application Specific Integrated Circuit (ASIC) 2121. The power source switching unit 27 is connected to the AFE 212, the memory 213, and the CIS 20 to thereby switch between the supply and shut-down of the power. The motor driver 211 controls driving of the original document feed motor 24.

The AFE 212 of the first reading image processing unit 21 removes noise from analogue image data read by the CIS 20, amplifies the processed image data, converts the amplified image data to digital image data with an A/D conversion, and outputs the converted digital image data to the second reading image processing unit 22.

The second reading image processing unit 22 includes a power source switching unit 27, an AFE 221, a memory 222, and an ASIC 223. The power source switching unit 27 is connected to the AFE 221, the memory 222, and the ASIC 223 to thereby switch between the supply and shut-down of the power. The ASIC 223 carries out various image processing such as shading compensation, γ correction, space filter (smoothing, derivation, laplacian, median, rank, etc.), removal of Moire.

When the scanner device 2 is not used for reducing the consumption power, the power source switching unit 26, 27 shuts off the power to thereby shut off power supply to at least any one of the CIS 20, the first reading image processing unit 21, and the second reading image processing unit 22. The reading unit 70 includes the first reading image processing unit 21 and the second reading image processing unit 22. If the power supply to the reading unit 70 is shut off, the power is supplied from the power source unit 10 to the scanner sensor 25 and the original document feed motor 24 without intervening by the power source switching unit 26 and 27. However, the power supply to the scanner sensor 25 and the original document feed motor 24 may be completely shut off in a similar manner to the reading unit 70.

The operations unit 23 includes keys such as a numeric keypad, a copy start key, and a mode setup key. Identification information of the input keys is transmitted to the system control unit 12. The system control unit 12 receives an operation and controls the operation of the image forming apparatus 100.

The scanner sensor 25 includes the original document insertion sensor S0 for determining the inserted original document, the original document size sensors S1 to S4 for detecting the original document size, the original document resisting sensor S5 for outputting an original document width signal in the sub scanning direction, the original document ejection sensor S6 for detecting ejection of the original document, the emergency stopping key S8 for stopping feeding of the original document, and a cover open and close detecting sensor (not illustrated).

The power source switching units 26 and 27 supply or shutoff the power supply to the reading unit 70 by a power source switching signal from the power source switching signal output unit 124. The power source switching units 26 and 27 may be provided in portions other than the first reading image processing unit 21 or the second reading image processing unit 22, and may be provided in the power source unit 10. The power source switching units 26 and 27 may be integrated into one unit.

<Functional Block>

Figure 5:
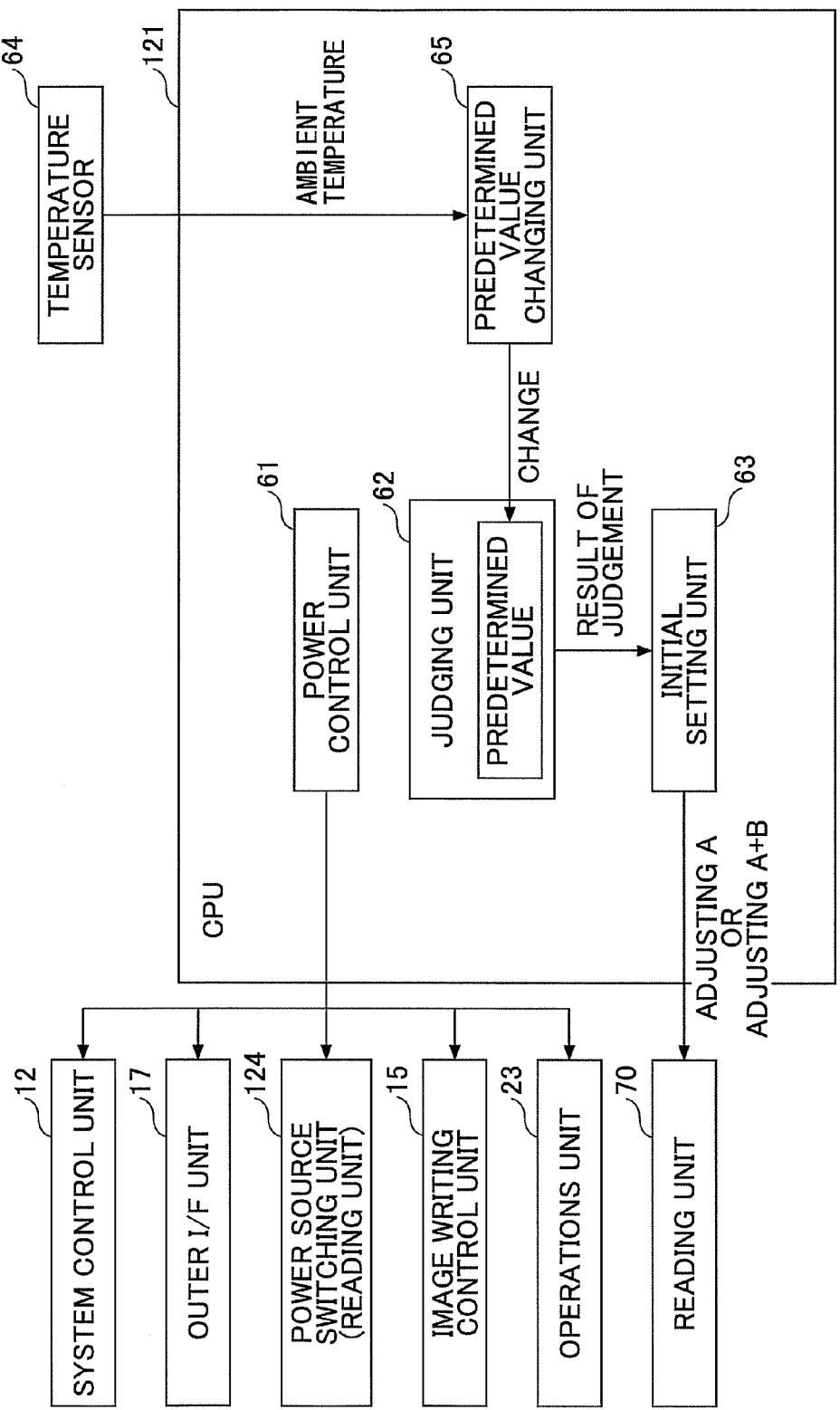
FIG. 5 illustrates an example functional block chart of the image forming apparatus.

FIG. 5 illustrates an example hardware block chart of the image forming apparatus 100. When the CPU 121 executes the program 1221 stored in the memory 122, the illustrated functions, the power control unit 61, the judging unit 62, an initial setting unit 63, and a predetermined value changing unit 65 are realized.

The power control unit 61 may control power supply to and power shut-off of the system control unit 12, the outer I/F unit 17, the I/O unit 13, the head 14, the image writing control unit 15, the image writing processing unit 16 (hereinafter referred to as image writing control unit, the power source switching signal output unit 124, the reading unit 70, and the operations unit 23, hereinafter, these portions may be referred to as various portions). The power supply to the reading unit 70 may be controlled when the power control unit 61 outputs the power source switching signal for powering on or off to the power source switching signal output unit 124 from the power control unit 61. When the power control unit 61 causes the power source switching signal output unit 124 to output the power source switching signal for shutting off the power supply, the timer 123 starts to measure the power stopping time.

The judging unit 62 determines that the initial setting A and the initial setting B are carried out when the power stopping time is a predetermined value or more, and determines that only the initial setting A is carried out when the power stopping time is less than a predetermined value. The initial setting unit 63 causes only the initial setting A to be carried out by the reading unit 70, or both the initial setting A and the initial setting B to be carried out by the reading unit 70.

In the initial setting A, the obtained setup information A is apt to change as the time passes. In the initial setting B, the obtained setup information B hardly changes as the time passes. Therefore, depending on whether the setup information is apt to change, the initial setting is divided into two sections. The initial setting B is carried out only when the power stopping time is a predetermined value or more. Thus, it is possible to reduce a rise time of the reading unit 70 as a whole while maintaining quality of read images.

The initial setting unit 63 carries out, as the initial setting A, an initializing process of setting an initial value in a register of an analogue ASIC 2121 of the AFE 212, a process of setting a parameter of the ASIC 223 by downloading a boot program into the ASIC 223, and a process of providing the ASIC 223 with a brightness distribution image for shading compensation. Parameters of the ASIC 223 are provided to correct sensitivities of R, G and B of the CISs 20. It is possible to restrict color variability of images read by the plural CISs 20 (for example, the number of the contact sensors is five).

The brightness distribution image for the shading compensation relates to light and dark distribution and a correction value obtained from the light and dark distribution. It is possible to prevent uneven brightness from occurring in an optical system including the CIS 20 by removing the brightness distribution image from the read image.

The initial setting unit 63 carries out an Automatic Gain Control (AGC) adjustment, white level adjustment, and black level adjustment. With the AGC adjustment, a gain of the output signal is automatically adjusted so that the output signal resides within an appropriate range irrespective of the magnitude of the input signal by feeding back an input signal to a scanner sensor 25. Especially when the light source is bluish, the gain can be adjusted to obtain appropriate white level. The white level adjustment adjust the light quantity of the CIS so that the CISs 20 have a standard value (for example, 255 in 256 gradations) when standard white board is read by the CISs 20. With a black level adjustment, the CISs 20 are adjusted so that the output values of the CISs 20 when the LED does not light (black level value) becomes a standard value of the output value (black level value) such as 0 in the 256 gradations.

The reason why the initial setting A and the initial setting B are separated is as follows. The shading compensation based on the brightness distribution image included in the initial setting A is required to be carry out frequently relative to the initial setting B including the AGC adjustment, the white level adjustment and the black level adjustment in order to assure a good image quality. Generally speaking, a temporal change of shading on an image pickup element such as a CIS may be faster than temporal changes of the AGC adjustment, the white level adjustment and the black level adjustment.

Because the AGC control relates to the output voltage of the CIS 20, it is necessary to correct the output mainly due to variation of the LED light. However, it is unnecessary to frequently carry out the AGC adjustment. Although the light quantity of the LED as the light source varies depending on the ambient temperature, a fluctuation range is small because the LED is driven by a constant current. Further, the white level and the black level mainly depend on the temperature of the sensor. Therefore, it is unnecessary to frequently carry out the white level adjustment and the black level adjustment.

A reason why the initial setting B is carried out when the power stopping time continues for a predetermined time or more is that there is a high probability of changes such as a ambient temperature change. The predetermined value may be determined as a timing causing the change in the condition of the adjustment.

Next, the predetermined value compared with the power stopping time is described. The predetermined value may be about 24 hours to 2 weeks. It is preferable to make the predetermined value variable depending on a degree of a change of temperature because the temperature is prone to influence a change of the setup information B.

Therefore, the predetermined value changing unit 65 regularly stores the ambient temperatures detected by a temperature sensor 64 of the image forming apparatus 100 and changes the predetermined value depending on a difference between a maximum value and a minimum value within a predetermined time, for example, 6 to 24 hours. For example, the predetermined value may be 2 weeks when the difference of the between the maximum value and the minimum value is 5 C.°. The predetermined value may be 1 week when the difference of the between the maximum value and the minimum value is 10 C.°. The predetermined value may be 3 days when the difference between the maximum value and the minimum value is 15 C.°. The predetermined value may be 24 hours when the difference of the between the maximum value and the minimum value is 20 C.°. A user can fix these predetermined values to an arbitrary time by operating the operations unit 23.

(Operational Mode and Transition of the Operational Mode)

FIG. 6 illustrates an example operational mode of the image forming apparatus 100 determined whether power is supplied to the various portions of the image forming apparatus 100. In FIG. 6, "ON" indicates the power supply to the various portions, and "OFF" indicates the power shut-off. These portions may be the system control unit 12, the outer I/F unit 17, the image writing control unit, the reading unit 70, and the operations unit 23. The image writing function unit includes the image writing control unit 15, the image writing processing unit 16, the head 14 and the I/O unit 13.

In a plug-in mode, the power is not supplied to all the various portions.

In a main SW start-up mode, the power is supplied to the various portions. The initial setting A alone or both of the initial setting A and the initial setting B are carried out in the main SW start-up mode.

In a stand-by mode, the power is not supplied only to the reading unit 70.

In a scanner mode, the power is supplied to all the various portions.

In a print 1 mode, the power is not supplied only to the reading unit 70.

In a print 2 mode, the power is not supplied to the reading unit 70 and is supplied to a part (main power key) of the operations unit 23 and the other portions.

In a sleep mode, the power is supplied to a part of the system control unit 12 (e.g. CPU 121) and a part of the operations unit 23 (e.g. main power key), and is not supplied to image writing function unit and the reading unit 70. When the power is supplied to the CPU 121 as in the sleep mode, the image forming apparatus 100 can receive various interrupts. Because the power is supplied to the main power key, it is possible to receive a start of the operation by the user.

There are several types of energy saving state since the power supply to a part or all of the various portions are shut off in the operational modes.

Figure 7:
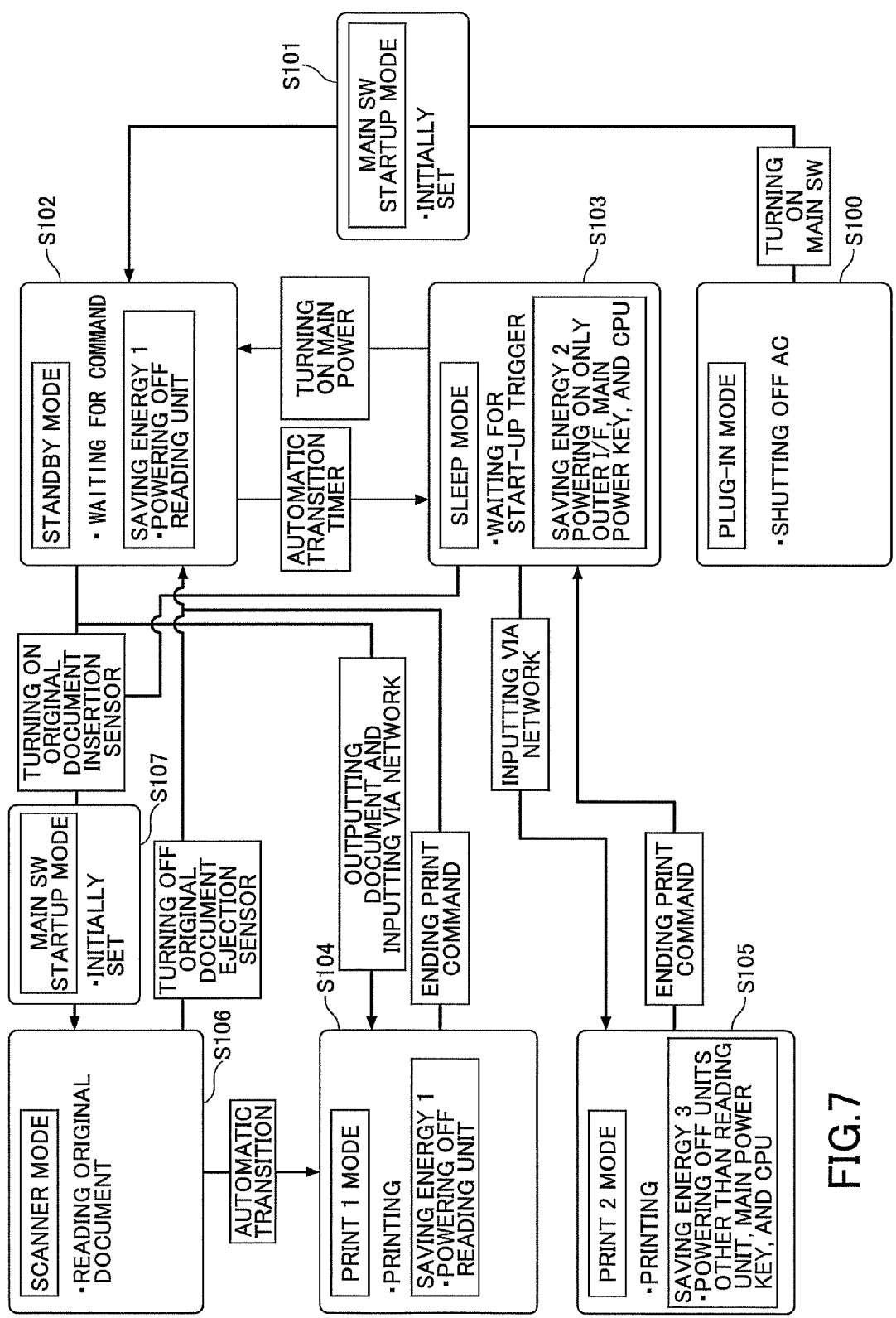
FIG. 7 illustrates a state transition diagram among the various operational modes and an example of saving energy.

FIG. 7 illustrates a state transition diagram among the various operational modes and an example of saving energy. First, the energy saving state is described.

(1) Energy Saving State 1: Stand-by Mode, Print 1 Mode

In the energy saving state, the power is not supplied to the reading unit 70.

(2) Energy Saving State 2: Sleep Mode

In the energy saving state 2, the power is supplied only to the outer I/F unit 17, a part of the operations unit 23 (main power key), and apart of the system control unit 12 (CPU 121).

(3) Energy Saving State 3: Print 2 Mode

In the energy saving state 3, the power is not supplied to the reading unit 70 and is supplied to the part (main power key) of the operations unit 23 and the other portions. Because the power consumption in the energy saving state 2 is the minimum, the power consumption can be reduced as a sleep mode.

Next, state transition among various modes is described. When a transition condition described among the operational modes illustrated in FIG. 7 is established, the power control unit 61 controls power supplied to the various portions to be turned on or off.

S100: Plug-in Mode

All power supply from the commercial power source is shut off. When the user turns on the main SW 11, the power control unit 61 starts to supply the power to various portions of the image forming apparatus 100.

S101: Main SW Start-Up Mode

When the power supply to the various portions of the image forming apparatus 100 is started, the initial setting unit 63 carries out the initial setting. As described, the initial setting includes the initial setting A and the initial setting B. Only the initial setting A or both of the initial setting A and the initial setting B are carried out. When it is transitioned from the plug-in mode to the main SW start-up mode, there is a probability that the initial setting B is carried out. Therefore, in the main SW start-up mode in step S107, the transition time from the sleep mode to the scanner mode can be shortened even though the initial setting B is not carried out.

When the initial setting unit 63 ends the initial setting, the power control unit 61 causes the power source switching signal output unit 124 to output a power source switching signal for turning off the power supply to the power source switching units 26 and 27. The power source switching unit 26 turns off the power supply to the AFE 212, the memory 213 and the CIS 20. The power source switching unit 27 turns off the power supply to the AFE 221, the memory 222 and the ASIC 223. With this, the main SW start-up mode is transitioned to the stand-by mode.

S102: Stand-by Mode

The stand-by mode may be transitioned to the sleep mode, the main SW start-up mode, or the print 1 mode. In the stand-by mode, the power is supplied to the operations unit 23 and the scanner sensor 25. Therefore, in the stand-by mode, the command is ready for being received.

(i) Sleep Mode

When the power control unit 61 detects passage of the predetermined time using the timer 123, the power control unit 61 turns off the power supply to the system control unit 12 except for the CPU 121 of the system control unit 12, turns off the power supply to the image writing control unit, and turns off the power supply to the operations unit 23 except for the main power key. With this, the stand-by mode is transitioned to the sleep mode.

(ii) Main SW Start-Up Mode

Since the power is supplied to the scanner sensor 25 in the stand-by mode, the original document insertion sensor S0 detects an insertion of the original document and generates an interruption into the CPU 121. With this, the power control unit 61 causes the power source switching signal output unit 124 to output a power source switching signal for turning on the power supply to the power source switching units 26 and 27. The power source switching unit 26 turns on the power supply to the AFE 212, the memory 213 and the CIS 20. The power source switching unit 27 turns on the power supply to the AFE 221, the memory 222 and the ASIC 223. With this, the stand-by mode is transitioned to the main SW start-up mode.

(iii) Print 1 Mode

Since the power is supplied to the outer I/F unit 17 in the stand-by mode, the outer I/F unit 17 causes the CPU 121 to generate an interruption when a document is sent via the network. With this, the stand-by mode is transitioned to the print 1 mode. The power control unit 61 does not specifically change the power supply or the power shut-off.

S103: Sleep Mode

The sleep mode may be transitioned to the stand-by mode, the main SW start-up mode, or the print 2 mode. In the sleep mode, since the power is supplied to the CPU 121 of the system control unit 12, the main power key of the operations unit 23, and the outer I/F unit 17, the image forming device is in the start-up trigger waiting mode in which a start-up trigger is made to wait for starting of the image forming apparatus 100.

(i) Stand-by Mode

When the user turns on the main power key of the operations unit 23, the operations unit 23 causes the CPU 121 to generate an interruption. The power control unit 61 turns on the entire power supply of the system control unit 12, not limited to the power supply to the CPU 121, the power supply to the image writing control unit, and the power supply to the entire operations unit 23 including the main power key. With this, the sleep mode is transitioned to the stand-by mode.

(ii) Main SW Start-Up Mode

When the original document insertion sensor S0 detects an insertion of the original document, the original document insertion sensor S0 causes the CPU 121 to generate an interruption. With this, the power control unit 61 outputs the power source switching signal for turning on the power supply to the entire system control unit 12 including the CPU 121, turning on the power supply to the operations unit 23 including the main power key, and turning on the power supply to the power source switching units 26 and 27 with the power source switching signal output unit 124. The power source switching unit 26 turns on the power supply to the AFE 212, the memory 213 and the CIS 20. The power source switching unit 27 turns on the power supply to the AFE 221, the memory 222 and the ASIC 223. With this, the sleep mode is transitioned to the main SW start-up mode.

(iii) Print 2 Mode

When a document is sent via the network, the outer I/F unit 17 causes the CPU 121 to generate an interruption. With this, the power control unit 61 turns on the entire power supply to not only the CPU 121 but also the entire system control unit 12 and turns on the power supply to the image writing control unit. With this, the sleep mode is transitioned to the print 2 mode.

S104: Print 1 Mode

In the print 1 mode, an image is being printed (formed) on the roll paper P. After the image writing control unit 15 carries out all print commands, the print 1 mode is transitioned to the stand-by mode. The power control unit 61 does not specifically change the power supply or the power shut-off.

S105: Print 2 Mode

In the print 2 mode, an image is being printed (formed) on the roll paper P. After the image writing control unit 15 carries out all print commands, the power control unit 61 turns off the power supply to the system control unit 12 except for the CPU 121 and turns off the power supply to the image writing control unit. With this, the print 2 mode is transitioned to the sleep mode.

S107: Main SW Start-Up Mode

When the power supply to the various portions of the image forming apparatus 100 is started, the initial setting unit 63 carries out the initial setting. As described, the initial setting includes the initial setting A and the initial setting B. Only the initial setting A or both of the initial setting A and the initial setting B are carried out.

After the initial setting unit 63 ends the initial setting, the main SW start-up mode transitions to the scanner mode. The power control unit 61 does not specifically change the power supply or the power shut-off.

S102: Scanner Mode

The scanner mode may transition to the stand-by mode or the print 1 mode. In the scanner mode, the original document is being read by the reading unit.

(iii) Print 1 Mode

When the user inputs a copy operation from the operations unit 23, the scanner mode is transitioned to the print 1 mode. After the scanner device 2 reads all original documents (the sensor 6 is turned off), the power control unit 61 causes the power source switching signal output unit 124 to output the power source switching signal for turning off the power supply to the power source switching units 26 and 27. The power source switching unit 26 turns on the power supply to the AFE 212, the memory 213 and the CIS 20. The power source switching unit 27 turns off the power supply to the AFE 221, the memory 222 and the ASIC 223. With this, the scanner mode is transitioned to the print 1 mode.

(ii) Stand-by Mode

When the user inputs only an operation of reading from the operations unit 23, the scanner mode is transitioned to the stand-by mode. After the scanner device 2 reads all original documents (the sensor 6 is turned off), the power control unit 61 causes the power source switching signal output unit 124 to output the power source switching signal for turning off the power supply to the power source switching units 26 and 27 in conformity with a predetermined passage of time. The power source switching unit 26 turns off the power supply to the AFE 212, the memory 213 and the CIS 20. The power source switching unit 27 turns off the power supply to the AFE 221, the memory 222 and the ASIC 223. With this, the scanner mode is transitioned to the stand-by mode.

(Operation Process)

Figure 8:
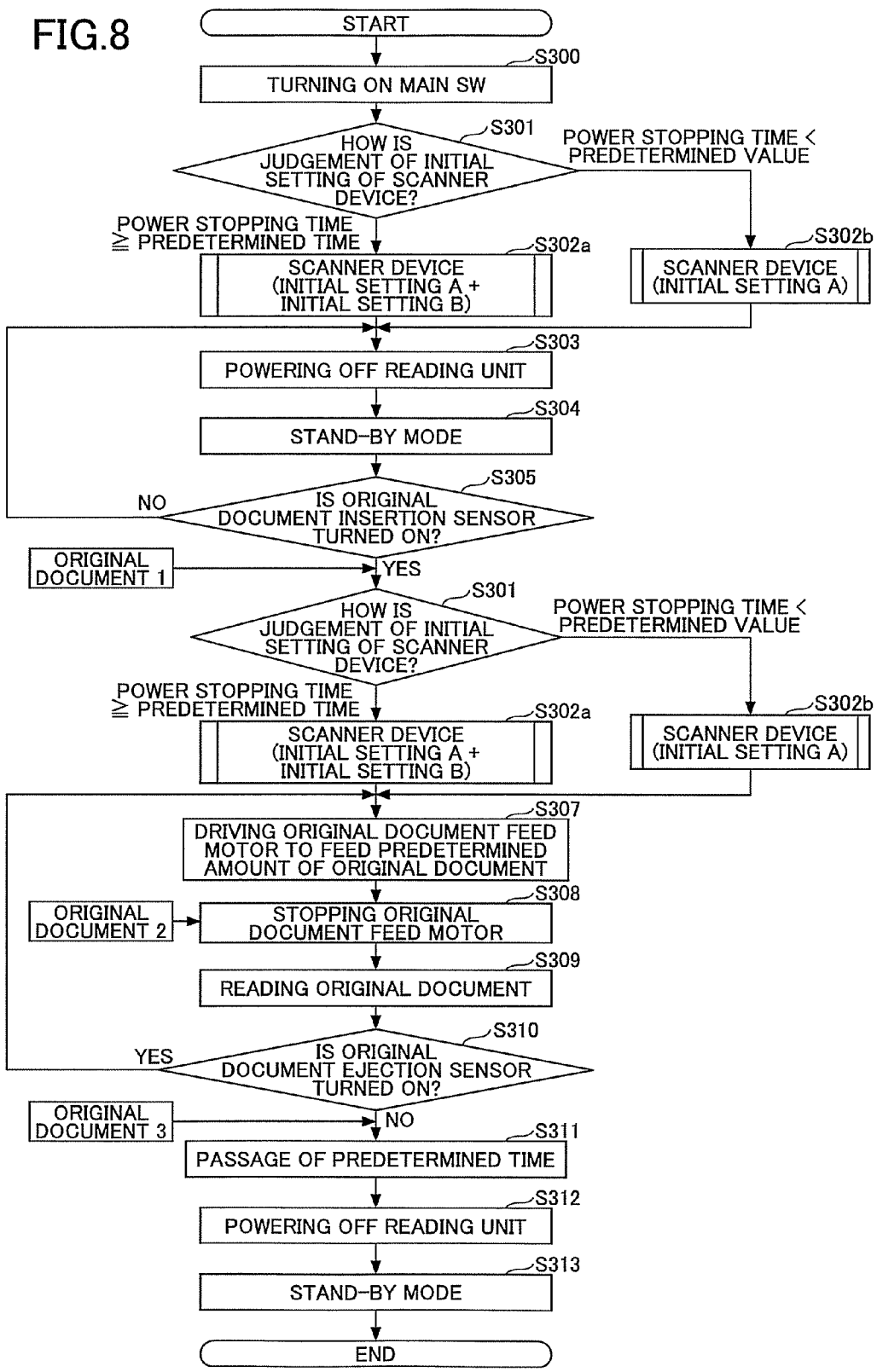
FIG. 8 is an example flowchart for illustrating an operational process of a scanner device.

FIG. 8 is an example flowchart for illustrating an operational process of the scanner device 2. Referring to FIG. 8, the image forming apparatus 100 becomes in the plug-in mode.

The user turns on the main SW 11 in the plug-in mode is step S300. With this the power supply to the various portions of the image forming apparatus 100 is started to cause the image forming apparatus 100 to become in the main SW start-up mode.

In the main SW start-up mode, the judging unit 62 determines whether a power stopping time has a predetermined value or more in step S301. When a relationship of "power stopping time<predetermined value" is established in comparison with the power stopping time measured by the timer 123 and the predetermined value, the judging unit 62 determines that only the initial setting A is carried out. When a relationship of power stopping time≧predetermined value (the power stopping time is larger than or the same as the predetermined value) is established in comparison with the power stopping time measured by the timer 123 and the predetermined value, the judging unit 62 determines that both the initial setting A and the initial setting A are carried out. The initial setting (S302a, S302b) are described in detail later.

After the initial setting of steps S302a and S302b ends, the power control unit 61 shuts off the power supply to the reading unit is step S303. With this, the main SW start-up mode is transitioned to the stand-by mode in step S304.

After the user inserts the original document into the original document insertion port 29, the original document insertion sensor S0 detects the original document in ON of step S305. After the passage of a predetermined time without a detection of the original document with the original document insertion sensor S0 in OFF of step S305, the stand-by mode is transitioned to the sleep mode.

When the original document insertion sensor S0 detects the original document, the power control unit 61 supplies the power to the reading unit to thereby transition to the stand-by mode, the sleep mode, or the main SW start-up mode. In a similar manner to step S301, the judging unit 62 determines whether the power stopping time is the predetermined value or more in step S301. The initial settings (S302a, S302b) are described in detail later.

After the initial setting of steps S302a and S302b end, the main SW start-up mode is transitioned to the scanner mode. Therefore, the scanner device 2 drives the original document feed motor 24 to thereby feed the original document by a predetermined distance.

After the original document is fed by the predetermined distance, the scanner device 2 stops the original document feed motor 24 in step S308 and reads the original document in step S309. While the original document ejection sensor 86 is turned on, the scanner device 2 repeats the operations of steps S307 to S309.

After the original document is read and the original document ejection sensor 86 is turned off in OFF of step S310, the timer 123 starts to measure the time. After passage of a predetermined time in step S311, the power control unit 61 stops the power supply to the reading unit 70. Thus, the scanner mode is transitioned to the stand-by mode in step S313.

Figure 9:
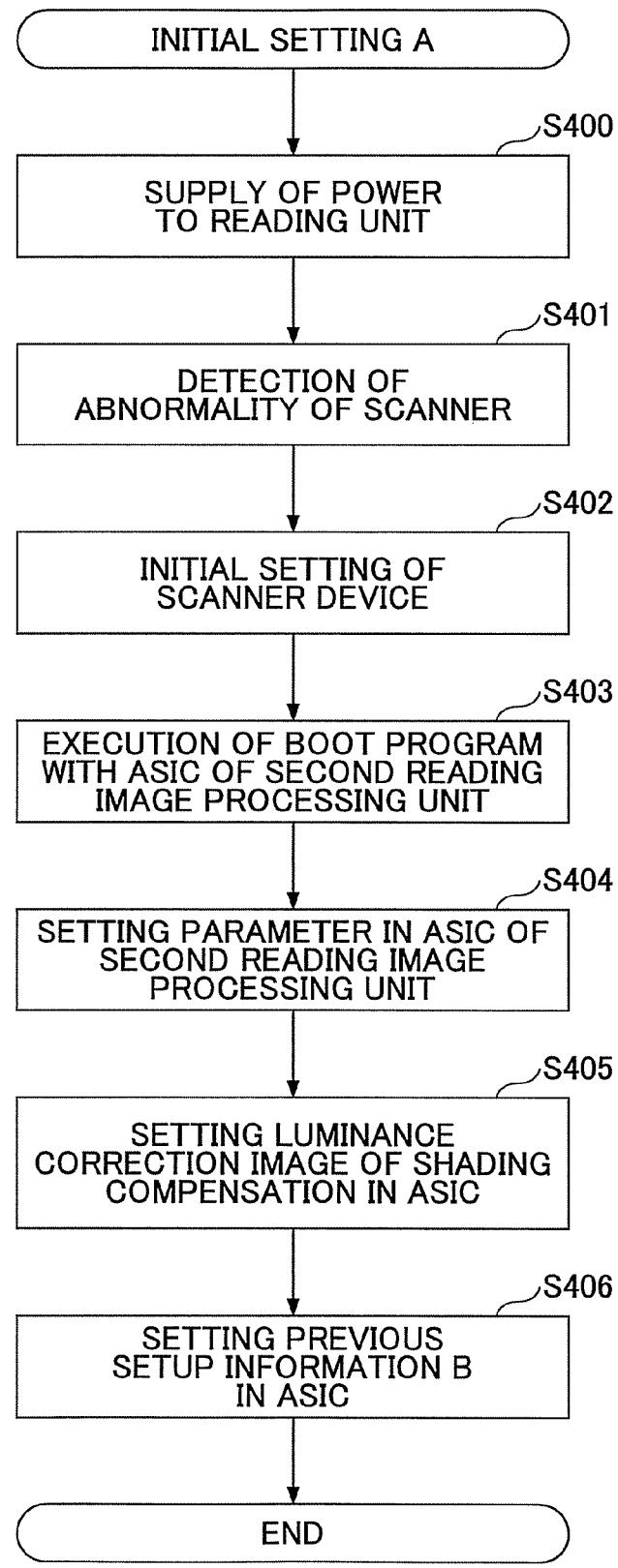
FIG. 9 is an example flowchart illustrating an operational process for initial setting A.
Figure 10:
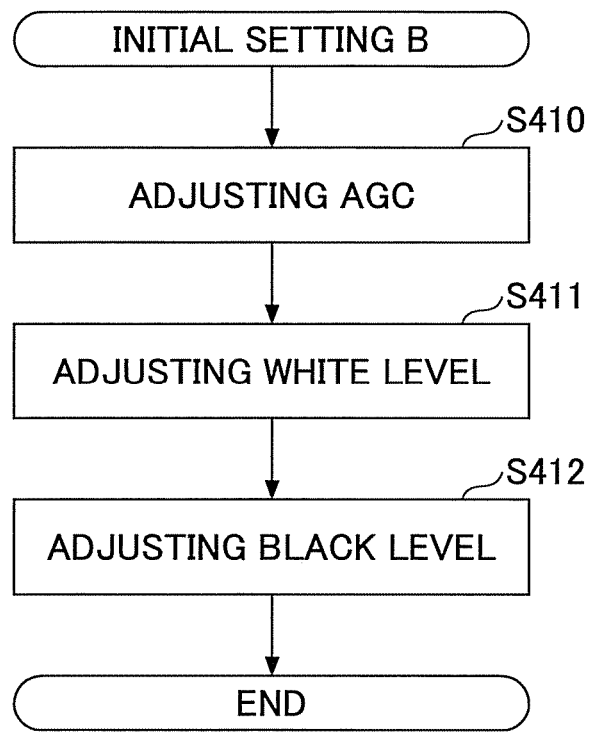
FIG. 10 is an example flowchart illustrating an operational process for initial setting B.

Next, the initial setting is described. FIG. 9 illustrates an example flowchart illustrating the process of the initial setting A. FIG. 10 illustrates an example flow chart illustrating the process of the initial setting B.

The initial setting is carried out in the main SW start-up mode. In the main SW start-up mode, the power is supplied to the reading unit 70 in step S400.

The initial setting unit 63 carries out the abnormality detection of the scanner device 2 in step S401. Specifically, an existence of an abnormal connection is checked by confirming a register access of a Field Programmable Gate Array (FPGA) installed in, for example, the first reading image processing unit 21 or the second reading image processing unit 22 of the scanner device 2.

Next, the initial setting unit 63 sets an initial value in the analogue ASIC 2121 of the AFE 212 of the first reading image processing unit 21 or a register of the FPGA in order to initialize the register of the FPGA (not illustrated) in step S402. This initial value is used for the initialization and does not change.

Next, the initial setting unit 63 downloads a boot program from the memory 222 into the ASIC 223 of the second reading image processing unit 22 in step S403. When the ASIC 223 carries out the boot program, the program for the initial setting is downloaded into the ASIC 223 from the memory 222.

Next, the ASIC 223 sets parameters for correcting sensitivity adjusted based on read values of R, G and B obtained from the CISs 20 in the register of the ASIC 223 in step S404.

Next, the ASIC 223 reads the standard white board and sets a brightness distribution image for shading compensation in the register of the ASIC 223 in step S405.

Hereinbefore, the initial setting A is described. The setup information B obtained by the initial setting B is required to be set in the reading unit 70 even if the initial setting unit B does not carry out the initial setting B. Therefore, the initial setting unit 63 stores previous setup information B which is stored in the memory 222 in the register of the ASIC 223 in step S406. The setup information B includes an adjustment value of AGC, an adjustment value of while level, and an adjustment value of black level.

When there are plural CISs 20 in the reading unit 70, in addition to the initial setting A, the initial setting unit 63 sets up connecting parameters of the plural CISs 20 in the main scanning direction and the sub scanning direction of the second reading image processing unit 22.

Next, the initial setting B is described. First, the initial setting unit 63 carries out the AGC adjustment so that the read values of the CISs 20 are involved in an appropriate range irrespective of the intensity of the input signal in step S410.

Next, the initial setting unit 63 carries out a white level adjustment for adjusting the light quantity of the CISs 20 so that the standard white board respectively on the CISs 20 is measured to have a standard value in step S411. Further, the initial setting unit 63 carries out the black level adjustment in step S412.

The initial setting unit 63 sets this setup information B in the ASIC 223 and stores it in the memory 222. With this, the initial setting B ends. The initial setting B may include at least any one of the AGC adjustment, the white level adjustment, and the black level adjustment.

As described in the above, the image forming apparatus 100 of the embodiment, it is possible to maintain the quality of the read image by carrying out both the initial setting A and the initial setting B when the sleep mode continues for along time (more than the predetermined value). When the sleep mode is determined not to continue for a long time, only the initial setting A is carried out thereby reducing the rise time of the image forming apparatus 100. Therefore, it is possible to satisfy both the reduction of the power consumption and the reduction of the rise time.

Thus, it is possible to maintain an energy saving effect and reduce a time loss for an initial setting as short as possible to thereby obtain an image forming apparatus having an improved operating efficiency.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-061691 filed on Mar. 17, 2010 and Japanese Priority Patent Application No. 2011-010921 filed on Jan. 21, 2011, the entire contents of which are hereby incorporated herein by reference.

What is claimed is:

1. An image forming apparatus comprising:
    a reading unit configured to read an original document and generate image data;
    a power source unit configured to supply power to the reading unit;
    a power source switching signal output unit configured to output a switching signal for switching between supply and shut-off of the power for at least one of an image pickup element included in the reading unit and an image processing unit included in the reading unit;
    a measuring unit configured measure a power stopping time while the power to the reading unit is shut off;
    a judging unit configured to determine whether to carry out only a first initial setting for setting a first setup value in the reading unit when the measured power stopping time is less than a predetermined time and whether to carry out both the first initial setting and a second initial setting for setting a second setup value in the reading unit when the measured power stopping time is the predetermined time or more; and an initial setting unit configured to carry out only the first initial setting or both the first initial setting and the second initial setting upon the determination by the judging unit.

2. The image forming apparatus according to claim 1, wherein a temporal change of the second setup value obtained by the second initial setting is faster than a temporal change of the first setup value by the first initial setting.

3. The image forming apparatus according to claim 1, wherein the second initial setting includes at least one of an AGC adjustment, a white level adjustment, and a black level adjustment.

4. The image forming apparatus according to claim 1, further comprising:
a predetermined value changing unit configured to set the predetermined time of the power stopping time smaller as a variation of an ambient temperature of the reading unit increases.

5. The image forming apparatus according to claim 1, further comprising:
a predetermined value changing unit configured to accept a change of the predetermined time to be a predetermined value.

6. The image forming apparatus according to claim 1, wherein the reading unit includes
the image pickup element,
a first image processing unit as a first part of the image processing unit for carrying out A/D conversion, and
a second image processing unit as a second part of the image processing unit for carrying out image processing, and
wherein the power source unit supplies the power to at least one of the an original document insertion sensor, an operations unit, and an outer I/F unit connected to a network while the power source unit shuts off the power supplied to the reading unit.

7. The image forming apparatus according to claim 1, wherein the power source switching signal output unit outputs the switching signal for causing the power source unit to supply the power to the reading unit when a connection between the power source and an external power source is changed from being shut-off to being connected, and
the initial setting unit carries out only the first initial setting or both the first initial setting and the second initial setting.

8. A power supplying method for an image forming apparatus including
a reading unit configured to read an original document and generate image data,
a power source unit configured to supply a power to the reading unit,
a power source switching signal output unit configured to output a switching signal for switching between supply and shut-off of the power for at least one of an image pickup element included in the reading unit and an image processing unit included in the reading unit, the power supplying method comprising:
measuring a power stopping time while the power to the reading unit is shut off;
determining whether to carry out only a first initial setting for setting a first setup value in the reading unit when the measured power stopping time is less than a predetermined time and whether to carry out both the first initial setting and a second initial setting for setting a second setup value in the reading unit when the measured power stopping time is the predetermined time or more; and
carrying out only the first initial setting or both the first initial setting and the second initial setting upon the determination by the judging.

9. The power supplying method according to claim 8, wherein a temporal change of the second setup value obtained by the second initial setting is faster than a temporal change of the first setup value by the first initial setting.

10. The power supplying method according to claim 8, wherein the second initial setting includes at least one of an AGC adjustment, a white level adjustment, and a black level adjustment.

11. The power supplying method according to claim 8, further comprising:
setting the predetermined time of the power stopping time smaller as a variation of an ambient temperature of the reading unit increases.

12. The power supplying method according to claim 8, further comprising:
accepting a change of the predetermined time to be a predetermined value.

13. The power supplying method according to claim 8, wherein, the power source switching output unit is also configured to output the switching signal for causing the power source unit to supply the power to the reading unit is output when a connection between the power source and an external power source is changed from being shut-off to being connected, and
wherein, in the carrying out, only the first initial setting or both the first initial setting and the second initial setting is used.

14. A non-transitory recording medium saving programs representing a sequence of instructions, the programs which when executed by a computer included in an image forming apparatus including
the computer, a reading unit configured to read an original document and generate image data, a power source unit configured to supply a power to the reading unit, and a power source switching signal output unit configured to output a switching signal for switching between supply and shut-off of the power for at least one of an image pickup element included in the reading unit and an image processing unit included in the reading unit,
the instructions cause the computer to functions as:
a measuring unit configured measure a power stopping time while the power to the reading unit is shut off;
a judging unit configured to determine to carry out only a first initial setting for setting a first setup value in the reading unit when the measured power stopping time is less than a predetermined time and carry out both the first initial setting and a second initial setting for setting a second setup value in the reading unit when the measured power stopping time is the predetermined time or more; and
an initial setting unit configured to carry out only the first initial setting or both the first initial setting and the second initial setting upon the determination by the judging unit.

15. The non-transitory recording medium according to claim 14,
wherein a temporal change of the second setup value obtained by the second initial setting is faster than a temporal change of the first setup value by the first initial setting.

16. The non-transitory recording medium according to claim 14,
   wherein the second initial setting includes at least one of an AGC adjustment, a white level adjustment, and a black level adjustment.

17. The non-transitory recording medium according to claim 14, further comprising:
   a predetermined value changing unit configured to set the predetermined time of the power stopping time smaller as a variation of an ambient temperature of the reading unit increases.

18. The non-transitory recording medium according to claim 14, further comprising:
   a predetermined value changing unit configured to accept a change of the predetermined time to be a predetermined value.

19. The non-transitory recording medium according to claim 14,
   wherein the power source switching signal output unit outputs the switching signal for causing the power source unit to supply the power to the reading unit when a connection between the power source and an external power source is changed from being shut-off to being connected, and
   the initial setting unit carries out only the first initial setting or both the first initial setting and the second initial setting.

* * * * *